Sept. 15, 1970  V. LODHOLM  3,528,142
WORM SCREW CLAMP
Filed May 31, 1968  3 Sheets-Sheet 3
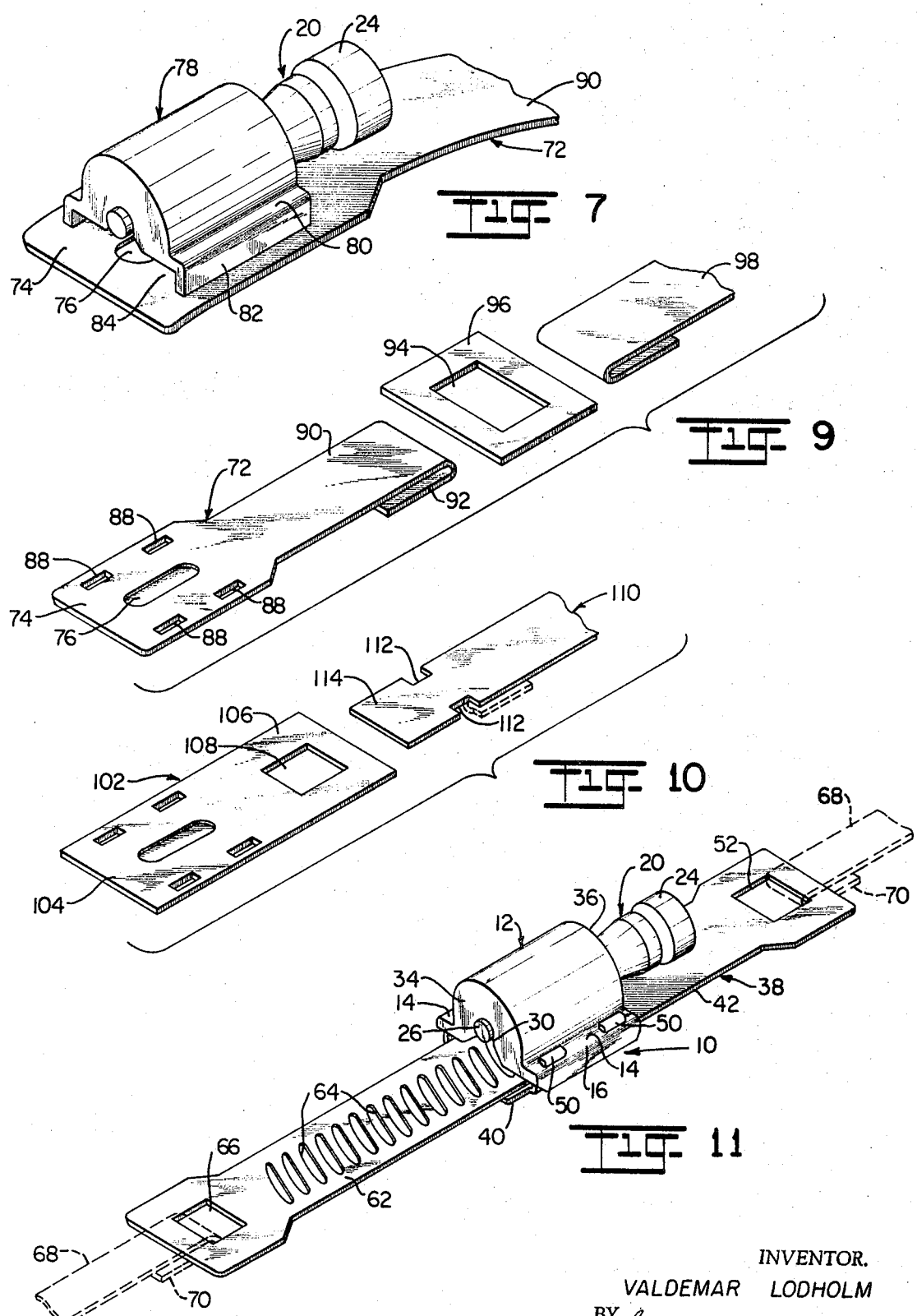
INVENTOR.
VALDEMAR LODHOLM
BY Sheridan and Ross
ATTORNEYS United States Patent Office 3,528,142
Patented Sept. 15, 1970

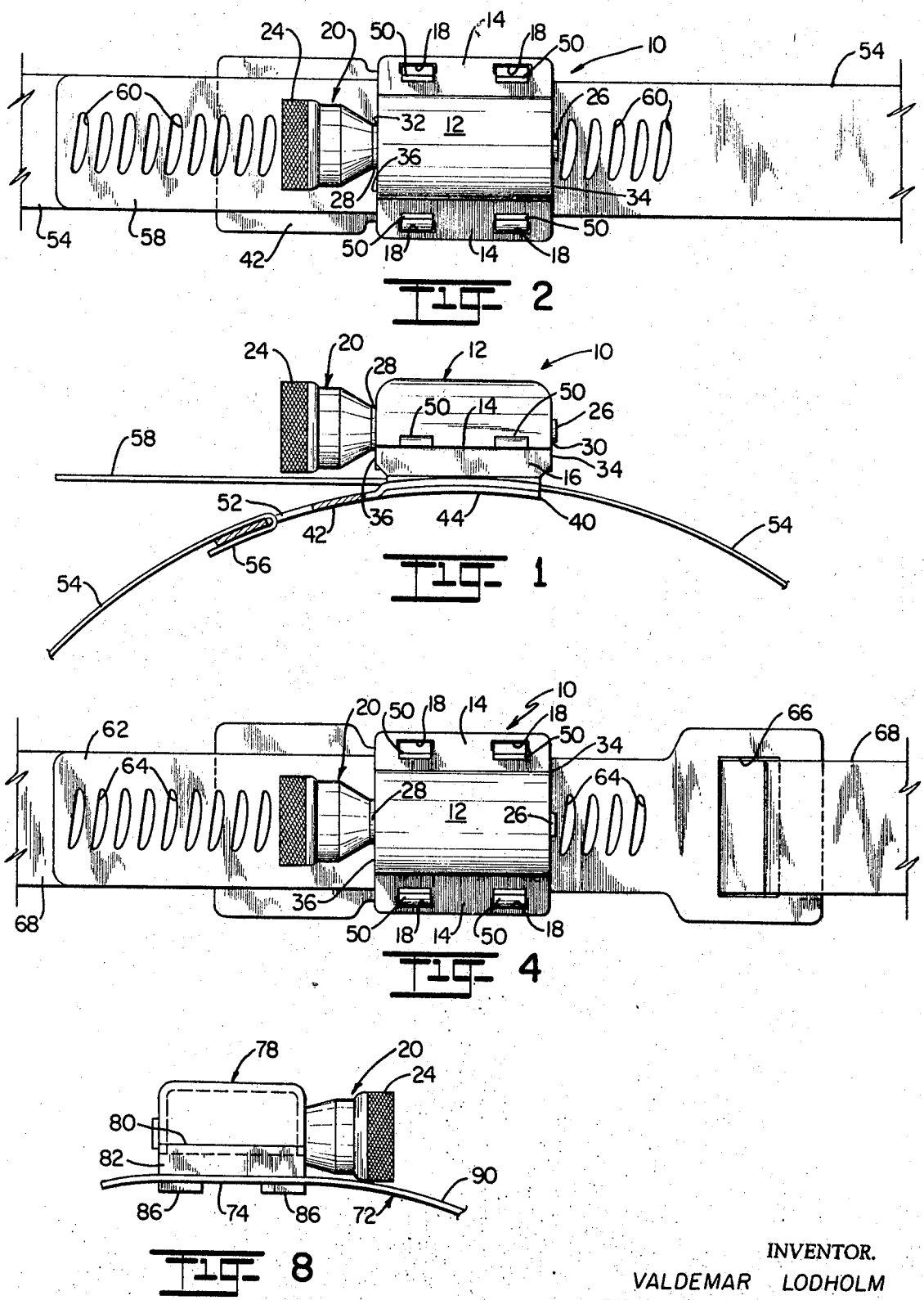

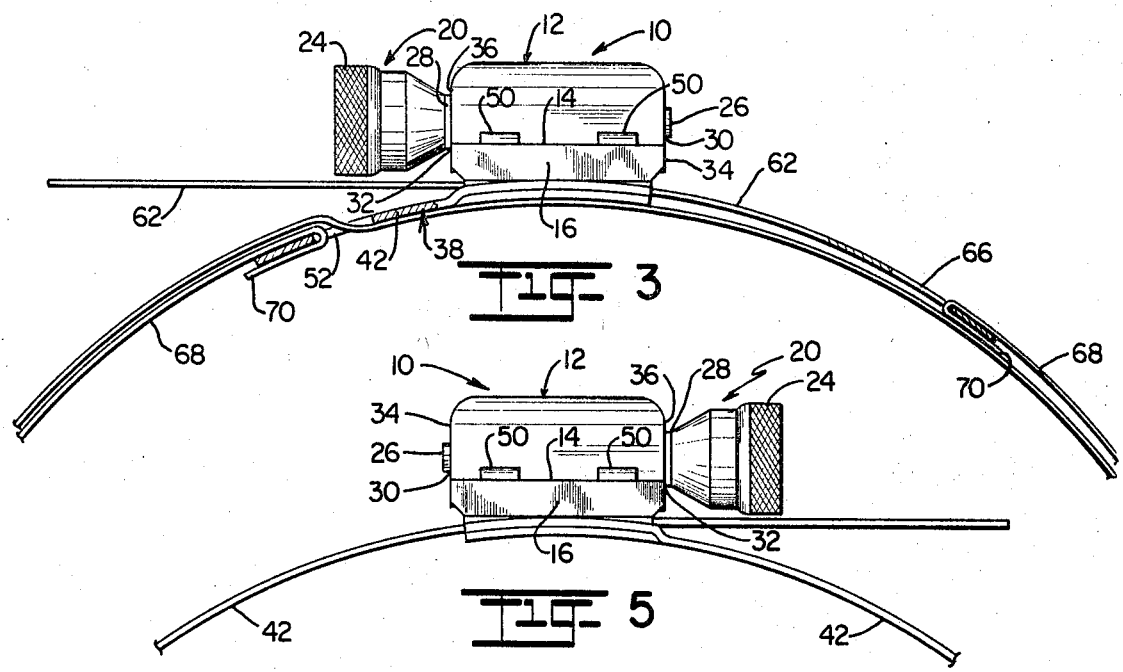
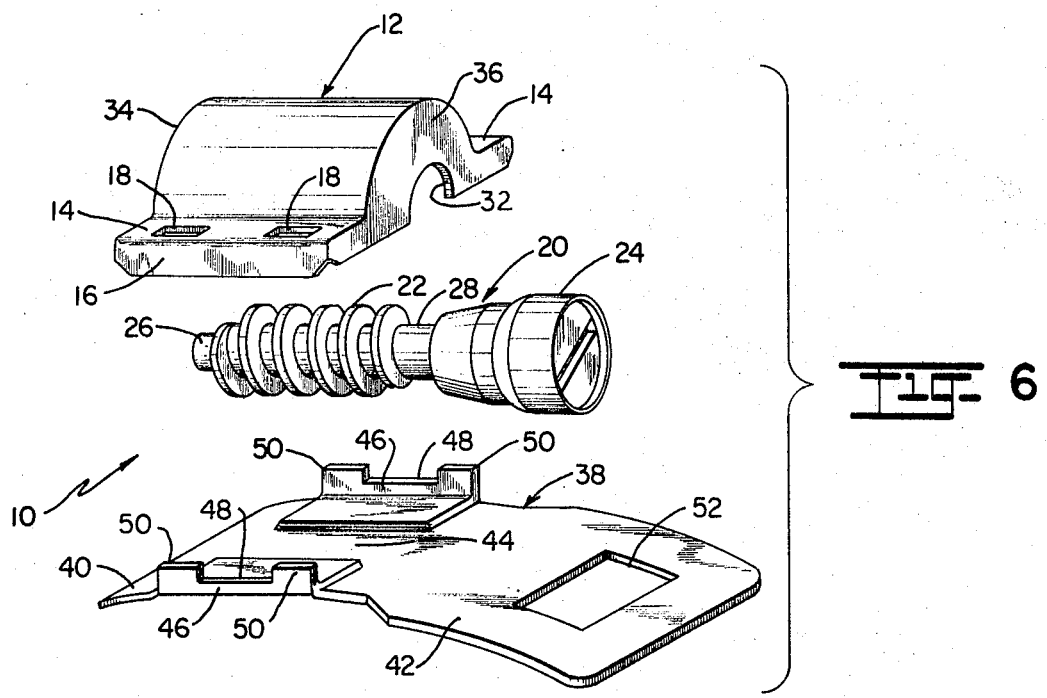

3,528,142
WORM SCREW CLAMP
Valdemar Lodholm, Golden, Colo., assignor to Band-It Company, Denver, Colo., a corporation of Colorado
Filed May 31, 1968, Ser. No. 733,338
Int. Cl. B65d 63/02
U.S. Cl. 24—274                      2 Claims

ABSTRACT OF THE DISCLOSURE

Band clamp comprises band, worm screw, and housing. One end of band closes open side of housing and is directly connected, with no intermediary components, to produce accurate size passage for free end of a band member. Band may be long enough to encircle hose or be shorter, with attachment aperture in free end, with auxiliary band having one re-bent hook end passing through aperture and other end slidable in passage. Auxiliary band may pass again through aperture to form double wrap clamp. A toothed band may drivenly engage in passage and have attachment aperture at free end. Auxiliary third band may be plain strap of any selected length with re-bent ends to engage apertures of first and second bands.

BACKGROUND OF THE INVENTION

This invention lies in the general field of band clamps. It is directed to worm screw type clamps in which one end of the band may be drawn through an actuator to reduce the loop circumference and constrict the band on a hose or the like, although it is not limited to such use. It is particularly directed to such a device which is of optimum simplicity for accurate manufacture and which provides a complete choice of lengths with a minimum inventory of component parts.

There are many band clamps presently on the market which comprise an elongate flexible band which may be looped around a hose or a pipe or the like, one end of the band being permanently attached to an actutaor housing containing a worm screw. The housing also is provided with a passage extending longitudinally therethrough in the direction of the axis of the screw sized and shaped to slidably receive the free end of the band. The latter is provided with tensioning teeth formations to be engaged by the worm screw to draw the band through the housing and tighten it about the article to be clamped.

The conventional manner of making such clamps is to form a semi-circular housing having lateral flanges and rotatably mount a worm screw in the housing. An attachment component is then secured to one end of the band by the use of various apertures and attaching tangs and is further formed to be secured to the housing flanges with other attachment means to close the open side of the housing and form with it a passage to slidably receive the other end of the band. It is very difficult to avoid distortion in the process with consequent difficulty in producing a passage which is just large enough to freely receive the band end and is never so small as to cause binding engagement. In addition, the market for clamps of this type is very competitive, and the extra component and forming operations inhibit reduction of costs to a minimum.

Another disadvantage of the conventional type clamp is that the permanently attached band must have some predetermined length and is economically usable only for a limited range of hose or pipe diameters. The tensioning formations are normally provided only on a short length of the free end, but even if they were provided along the entire length it would be impractical to use a band twelve inches long on a one inch hose and cut off and discard the excess strap. Consequently, separate clamps are made for approximately every one inch range of hose or pipe diameter, and this requires the maintenance of an excessively large inventory at considerable cost.

SUMMARY OF THE INVENTION

The device of the present invention overcomes all of the difficulties mentioned above by the use of components which simplify manufacture and make any size clamp available with a minimum stock of parts.

Generally stated, the housing is quite conventional including a semi-cylindrical shell having lateral flanges, each flange preferably being provided with a second flange extending at right angles thereto. One end of the band, referred to as the plate portion, is formed with integral upstanding side walls which are spaced apart laterally the exact distance to freely receive the end of a clamping band. The side walls have a height exactly right to provide clearance for the thickness of a clamping band. The plate portion is positioned to underlie and close the open side of the housing with the free edges of the side walls contacting the lateral flanges of the housing to complete a passage of the proper height. Attachment openings are formed in the lateral flanges and attachment tangs integral with the side walls pass through the openings to secure the two components together. A conventional worm screw is rotatably mounted in the housing before the two components are secured together. Each of the two components can be formed very accurately before assembly so that the proper clearance in the passage is obtained automatically. When the usual third component is employed, the distortion of the band end and component make it very difficult to maintain the proper tolerances.

The smaller sizes of clamps, for hoses up to two or three inches in diameter, are ordinarily used in great quantity and it is desirable to have fixed length unitary bands for each size range. For this purpose, that portion of the band which is a continuation of the plate portion is made to the various desired length for the small size ranges and provided at its free end with tensioning teeth formations.

As hose and pipe sizes increase, the required number of bands of any given size decreases drastically. This problem is taken care of in either of two ways. In a first variation the band member which is unitary with the housing is relatively short and is provided at its free end with an attachment aperture of sufficient width to receive the end of an auxiliary band. The housing and short band member then constitute a universal standard part. Auxiliary band members are then formed of various selected lengths. Each auxiliary band member is provided at a first end with a re-bent hook formation to engage in the aperture of the first band member and is provided at its second end with tensioning teeth formations. Thus a clamp for any given diameter can be made up with the universal standard part and an auxiliary band member of the proper length.

In a second variation, the same universal standard part is provided. A second, short band member is provided throughout most of its length with tensioning teeth formations and is mounted in the actuator housing to extend longitudinally in the opposite direction from the first band member. Its free end is provided with an attachment aperture corresponding to the one in the first band member. An auxiliary band of any desired length can now be formed of plain strap material with a re-bent hook formation at each end to engage the two attachment apertures and form a complete loop. The outstanding advantage of this arrangement is that the housing and first two band members become a universal standard part for all sizes, and the strap material can be stored in a roll 100 feet or more in length. Whenever a clamp is to be made up, the mechanic merely cuts off a piece of strap of the appropriate length, bends over the ends into hooks and connects it to the universal standard part.

BRIEF DESCRIPTION OF THE DRAWINGS

Various other advantages and features of novelty will become apparent as the description proceeds in conjunction with the accompanying drawings, in which:

FIG. 1 is a side elevational view of one form of the invention with parts broken away and in section;

FIG. 2 is a top plan view of the device of FIG. 1;

FIG. 3 is a side elevational view similar to FIG. 1, showing a modified form of the invention;

FIG. 4 is a top plan view of the device of FIG. 3;

FIG. 5 is a side elevational view similar to FIG. 1, showing a further modified form of the invention;

FIG. 6 is an exploded view in perspective of the actuator components;

FIG. 7 is a perspective view of a modified form of the actuator;

FIG. 8 is a side elevational view of the device of FIG. 7;

FIG. 9 is a perspective view of a modified form of connection;

FIG. 10 is a perspective view of a further modified form of connection; and

FIG. 11 is a perspective view of one of the universal standard parts.

DESCRIPTION OF THE PREFERRED EMBODIMENTS

The nature of the invention is generally illustrated in FIGS. 1, 2, and 6, where it will be seen that the actuator 10 comprises a generally semi-cylindrical housing 12 having laterally extending flanges 14 which lie in a common plane parallel and in proximity to the axis of the housing. Flanges 14 are provided at their outer margins with secondary flanges 16 at right angles thereto and extending downwardly as viewed in FIG. 6. Flanges 14 are further provided with attachment aperture means 18.

An actuator screw 20 includes a helical screw portion 22, a head 24 and journal sections 26 and 28 adapted for rotation in bearings 30 and 32 formed in the end walls 34 and 36 of the housing 12. The screw is rotatably mounted in the housing, the open side of which is closed by a portion of the band member 38. The latter includes a base or plate portion 40 and a second band portion 42. The plate portion has a depression 44 to provide clearance for screw portion 22 and has a pair of upstanding side walls 46 of exactly the correct height to provide clearance for the thickness of the band which is to be received. The upper edges 48 of the side walls 46 are generally planar and contact the under surfaces of flanges 14 to define the complete passage for the sliding reception of an encircling band. Since the height of side walls 46 can be very accurately controlled, the clearance for the thickness of the band can easily be held within design tolerances. Attachment means 50, integral with side walls 46, pass through aperture means 18 and can be clinched in any manner to produce a rigid, permanent actuator assembly.

As mentioned previously, there is a large demand for the smaller size clamps, up to two or three inches, and it is preferable to make them unitary. In such case, the second portion 42 of the band is made long enough to completely encircle a selected size of hose and its free end is provided with tensioning teeth formations to be engaged by screw 20. A clamp of this type is illustrated in FIG. 5. In the larger sizes it is desirable to use the actuator as a separate universal standard part. For this purpose portion 42 is made relatively short, as indicated in FIGS. 1, 2, and 6 and substantially wider than the width of the passage through the actuator. An attachment aperture 52 is formed through the free end of portion 42 and is of sufficient lateral width to receive the width of a clamping band.

As best seen in FIGS. 1 and 2, an auxiliary encircling band 54 is provided at a first end with a re-bent hook portion 56 which passes through aperture 52 to attach the auxiliary band to the first band. The second end 58 of band 54 is provided with tensioning teeth formations 60, here shown as slots angled to match the pitch of screw portion 22. After the band has been looped around the article to be clamped, end 58 is inserted in the longitudinal passage through the actuator and screw 20 is rotated to draw the band through the actuator until it tightly clamps the article.

A second universal standard part can be made as shown in FIG. 11. In this case, actuator 10 and band member 38 are the same as those shown in FIG. 6. A second band member 62 is provided throughout most of its length with tensioning teeth formations 64 for engagement by screw 20 and its first end is mounted in the passage in actuator 10, its second end extending longitudinally away from the first band member. Its outer free end is provided with an attachment aperture 66 substantially the same as aperture 52. It will be seen that a third, auxiliary band member 68 of any desired length may be provided at its ends with re-bent hook portions 70 to be passed through apertures 52 and 66 to produce a complete clamp of any desired circumference.

There are occasions when it is desirable to have a double loop clamp. Those which are presently available have several disadvantages. One type has one split loop and a second loop lying between the halves of the first, and another type has two half width loops. In either case, they develop only about the strength of a single loop. Moreover, because they have such a special configuration, each one must be individually made to clamp an article of a particular diameter.

With the present invention it is possible to make a double loop clamp which has the desired double strength and moreover to make it to fit any desired size. As seen in FIGS. 3 and 4, the hook 70 of strap 68 is passed through aperture 52 of band portion 38. After a first loop is completed, the remainder of the strap is passed through aperture 52 to overlie the first loop. The hook 70 at the free end is then passed through aperture 66 in band member 62, which in turn is drawn through actuator 10. It will be readily apparent that there are two full loops of full width strap to produce double strength. Moreover, the strap may be cut to any desired length from a supply roll with no waste, thus avoiding the need to stock a multiplicity of clamp size. Where a large number of double loop clamps of one size are being used, the free end of the strap may be provided with tensioning teeth formations, eliminating the need for member 62, while still retaining the other advantages of the construction.

A modified type of actuator is shown in FIGS. 7 and 8 which may be used with any type of clamp shown or described herein. In this form, the band 72 has a first, plate portion 74, which is essentially flat, although it may be made slightly arcuate to conform to the curvature of small diameter hose and pipe. A depression 76 is provided to afford clearance for screw 20. Semi-cylindrical housing 78 has lateral flanges 80 which in turn have depending secondary flanges 82, the edges of which contact plate portion 70 to define therewith a longitudinal passage 84 to slidably receive the end of an encircling band. Attachment means in the form of tangs 86, integral with flanges 82 pass through apertures 88 in plate portion 74 and are clinched in any manner to produce a rigid permanent actuator assembly.

The free end portion 90 of band 72 may be made long enough to encircle a hose of any desired size and may be provided at its end with tensioning teeth formations.

Another form of releasable connection means makes use of the same band member 72 in a shortened form. As seen in FIG. 9, portion 90 is relatively short and provided at its free end with a re-bent hook formation 92, which is adapted to engage in aperture 94 of connector link 96. An auxiliary band member 98 of any desired length is also provided with a re-bent hook formation 100 to engage in aperture 94. It is to be understood that this releasable connection arrangement may be used in place of or in addition to those already described.

FIG. 10 shows a variation which is useful in preventing inadvertent separation of a band from a connector when the parts are not in a clamped condition. In this form, the first band portion 102 has a plate portion 104 adapted to be secured to housing 78 as described above. However, the free end 106 is of substantially the same width as portion 104 and is provided with an aperture 108 to receive the end of auxiliary band 110. The latter has a narrow or necked down section 112 between the main body portion and portion 114 which is to be re-bent about the dotted lines to form a hook. Aperture 108 is as wide as section 112 plus clearance and hence it is narrower than portion 114, preventing inadvertent removal. In order to admit portion 114, aperture 108 is made long enough in the direction of the length of band 102 so that its diagonal dimension will pass portion 114, after which the parts are swung into alignment. This feature may also be used with the other forms of the invention.

It will be apparent to those skilled in the art that various changes may be made in the features of construction as disclosed without departing from the spirit of the invention.

I claim:

1. A worm screw clamp device comprising: an elongate semi-cylindrical housing having a flange extending from each side in a common plane parallel to the axis of the housing; a clamping band having a generally planar end portion overlying the open side of said housing; side walls integral with the outer edges of said flanges and extending into engagement with said end portion of said band to define between them a longitudinal passage through the housing sized and shaped to slidably receive a clamping band of predetermined width and thickness; there being attachment aperture means passing through the side marginal portions of said band end portion; attachment means integral with said side walls and passing through said apertures to permanently secure said end portion to said housing; and a worm screw mounted for rotation within said housing.

2. A double-wrap worm screw hose clamp comprising: an actuator housing having a longitudinal passage therethrough to slidably receive the end of a clamping band; a worm screw rotatably mounted in said housing to engage the band end and drive it through the housing; a first band member fixedly secured to said housing and extending longitudinally away therefrom; there being an attachment aperture passing through the free end of said band member; a second band member having an end in the form of a re-bent hook portion passing through said aperture to seccure it to the first band member; said second band member being formed into a first loop and passing through said aperture and overlying the exterior of said first loop to form a second loop; the free end of said second band member slidably passing through the passage in the housing and being engaged by the worm screw to tighten the clamp about a hose or the like.

References Cited

UNITED STATES PATENTS

| 1,189,404 | 7/1916 | Stulp | 24—282 |
| 1,274,688 | 8/1918 | Cooper et al. | 24—280 |
| 2,318,946 | 5/1943 | Kass | 24—282 |
| 3,087,220 | 4/1963 | Tinsley | 24—274 |
| 3,396,439 | 8/1968 | Schaub | 24—274 |

FOREIGN PATENTS

| 1,264,779 | 5/1961 | France. |
| 455,907 | 10/1936 | Great Britain. |

DONALD A. GRIFFIN, Primary Examiner